United States Patent
Fan (10) Patent No.: US 9,062,818 B2
(45) Date of Patent: Jun. 23, 2015

(54) CLAMPING APPARATUS

(71) Applicant: Eagle Fan, Chu-Pei (TW)

(72) Inventor: Eagle Fan, Chu-Pei (TW)

(*) Notice: Subject to any disclaimer, the term of this patent is extended or adjusted under 35 U.S.C. 154(b) by 169 days.

(21) Appl. No.: 13/948,812

(22) Filed: Jul. 23, 2013

(65) Prior Publication Data

US 2015/0028170 A1    Jan. 29, 2015

(51) Int. Cl.
*F16M 11/04*    (2006.01)
*F16B 2/12*    (2006.01)

(52) U.S. Cl.
CPC . *F16M 11/04* (2013.01); *F16B 2/12* (2013.01)

(58) Field of Classification Search
CPC ..... F16M 11/04; F16M 11/00; F16M 11/041; F16M 13/022; F16M 2200/022; F16M 2200/08; F16M 11/24; F16B 2/12; H04M 1/04; A47F 5/00; A47F 5/0081; A47F 5/10; B65G 49/062; G06F 1/1616; G06F 1/1656; G06F 1/1637
See application file for complete search history.

(56) References Cited

U.S. PATENT DOCUMENTS

| | | | | |
|---|---|---|---|---|
| 5,615,258 A * | 3/1997 | Ho | | 379/446 |
| 5,982,885 A * | 11/1999 | Ho | | 379/446 |
| 8,027,464 B2 * | 9/2011 | Piekarz | | 379/455 |
| 8,074,951 B2 * | 12/2011 | Carnevali | | 248/313 |
| D697,515 S * | 1/2014 | Adelman et al. | | D14/447 |
| 8,627,953 B1 * | 1/2014 | Yeo | | 206/320 |
| 8,905,367 B2 * | 12/2014 | Bury | | 248/316.4 |
| 2006/0183511 A1 * | 8/2006 | Shen | | 455/575.1 |
| 2012/0025036 A1 * | 2/2012 | Huang | | 248/122.1 |
| 2012/0325689 A1 * | 12/2012 | Wibby et al. | | 206/45.2 |

* cited by examiner

*Primary Examiner* — Brian D Mattei
(74) *Attorney, Agent, or Firm* — Rabin & Berdo, P.C.

(57) ABSTRACT

A clamping apparatus is provided, including a base unit, a movable unit, a carrier unit, a clamping element located on base unit and two stop elements located on carrier unit; wherein the base unit includes a placement surface for placing an electronic device; the movable unit partially extends into base unit and can move linearly; the carrier unit is detachably disposed at movable unit; the clamping element and stop elements protrude respectively on two sides of placement surface so that electronic device can be clamped between clamping element and two stop elements. The feature is that the stop elements have an arc shape and are partially engaged to carrier unit with elasticity to expand outward, and maximum clamping distance between two stop elements is increased when applying external force. As such, when the size of electronic device changes by protective cover, the clamping apparatus still maintains good clamping effect.

6 Claims, 8 Drawing Sheets

CLAMPING APPARATUS

FIELD OF THE INVENTION

The present invention generally relates to a clamping apparatus, and more specifically to a clamping apparatus able to clamp an electronic device when the width of the electronic device is widened by a protective cover.

BACKGROUND OF THE INVENTION

As the technology progresses, the portable electronic devices with large displays are ubiquitous for various applications, such as, mobile phone, personal media player, GPS, e-book or e-dictionary. The multi-function of the product brings convenience with a higher price tag so that the user must cautiously protect the product with an extra protective cover.

The conventional camping apparatus for holding a portable electronic device is often designed to match the size of the portable electronic device. However, when the device wears an extra protective cover, the overall size changes and is different from the size that the dedicated clamping apparatus is designed for. In addition, as there are many choices for protective covers, such as, monolithic silicone cover, leather cover, hard plastic cover, and so on, the final size would also vary depending on the type of protective cover used. As such, the dedicated clamping apparatus can no longer be used or with reduced clamping effect. Therefore, it is imperative to devise a clamping apparatus to address such an issue.

SUMMARY OF THE INVENTION

The primary object of the present invention is to provide a clamping apparatus, mainly suitable for electronic device of specific size but able to maintain good clamping effect when the size of the electronic device increases with a protective cover.

Another object of the present invention is to provide a clamping apparatus able to adjust the position of a clamped electronic device. The present invention uses three-point clamping to hold the electronic device. However, the two points clamping the corners of the electronic device can be adjusted laterally to change the position of the electronic device. As such, the clamping apparatus can avoid shielding the camera lens at the back of the electronic device when clamping on the electronic device.

To achieve the above objects, the present invention includes a base unit, a movable unit, a carrier unit, a clamping element located on the base unit and two stop elements located on the carrier unit; wherein the base unit includes a placement surface for placing an electronic device; the movable unit partially extends into the base unit and can move linearly; the carrier unit is detachably disposed at the movable unit; the clamping element and the stop elements protrude respectively on two sides of the placement surface so that the electronic device can be clamped between the clamping element and two stop elements. The feature of the present invention is that the stop elements have an arc shape and are partially engaged to the carrier unit with elasticity to expand outward, and the maximum clamping distance between the two stop elements is increased when an external force is applied.

Furthermore, to enable the clamping position adjustment on the electronic device, a partial segment of the movable unit is disposed with an engaging trench and the carrier unit is disposed with a sliding track. The carrier unit uses the sliding track to slide into the engaging trench so that the two can be fixed together. By adjusting the relative position of the two after sliding in, the positions of the two stop elements are also changed to achieve the object of adjusting the clamping position on the electronic device.

In addition, the present invention is a dedicated clamping apparatus, mainly for an electronic device of a specific size. However, to avoid being suitable for only a single product, the present invention employs a design that the carrier unit is detachably disposed to the movable unit, which means that the carrier unit is replaceable. The user can change the carrier unit for corresponding electronic device to transform the clamping apparatus dedicated to another product of different specifications. As such, the application of the present invention is extended.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
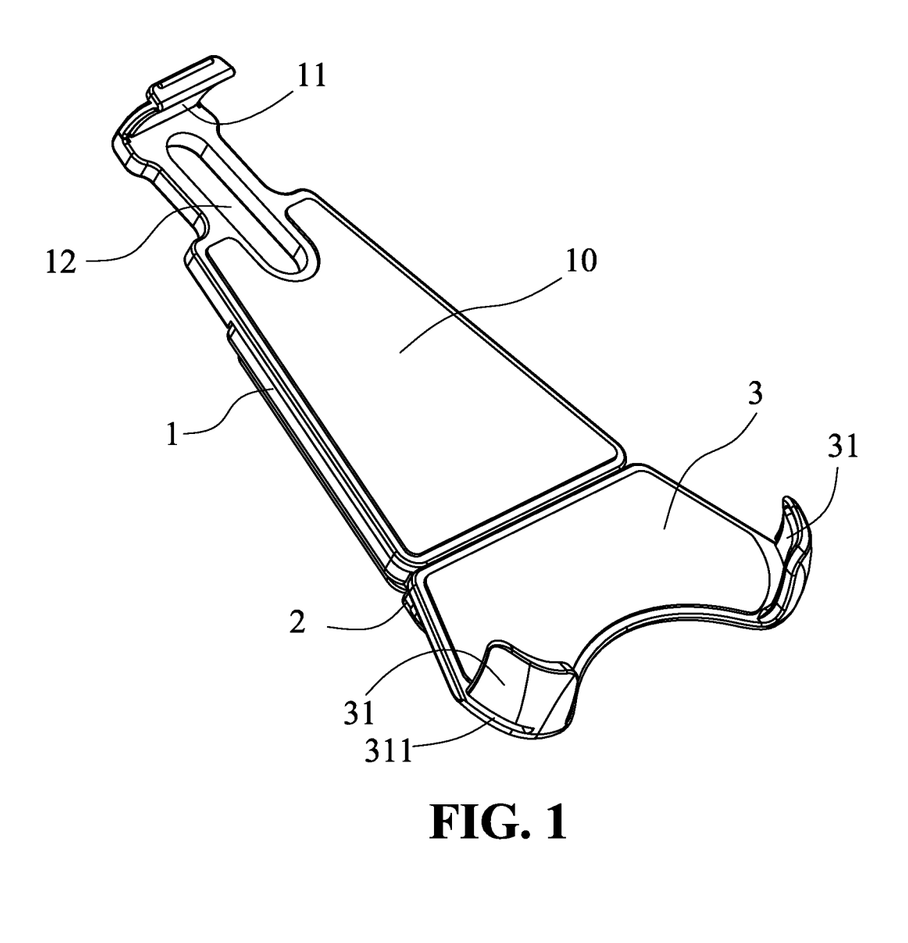
FIG. 1 shows a schematic view of the present invention.
Figure 2:
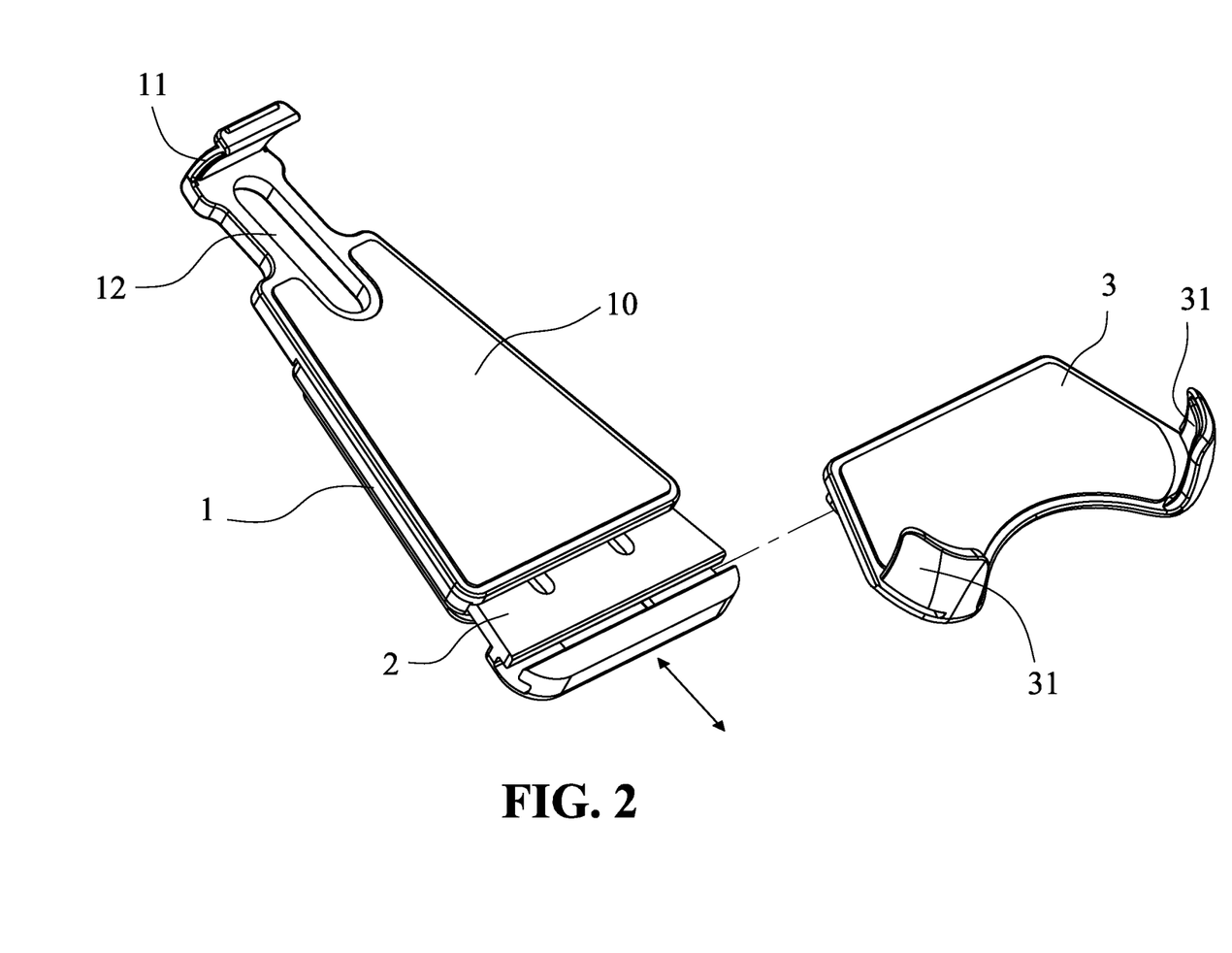
FIG. 2 shows a dissected view of the main component of the present invention, with the movable unit already moving for a short distance.

As shown in FIG. 1 and FIG. 2, the clamping apparatus of the present invention includes a base unit 1, a movable unit 2, a carrier unit 3, a clamping element 11 located on the base unit 1 and two stop elements 31 located on the carrier unit 3. The base unit 1 includes a placement surface 10 for placing an electronic device. The movable unit 2 partially extends into the base unit 1 and can move linearly. The carrier unit 3 is detachably disposed at the movable unit 2. The clamping element 11 and the two stop elements 31 protrude from two opposite sides of the placement surface 11 so that the electronic device can be clamped and held between the clamping element 11 and two stop elements 31. The stop elements 31 have an arc shape with the bottom only partially engaged to the carrier unit 3 so that the edge shows the elasticity to expand outward. When an external force is applied to the stop elements 31, the maximum clamping distance between the two stop elements will increase so as to maintain to clamping effect when the size of the electronic device increases due to the protective cover.

The stop elements 31 are only partially engaged to the carrier unit 3 at the bottom so that a gap 311 exists at the junction of the carrier unit 3 and the stop elements 31. A distance exists between the two stop elements 31 and the two stop elements 31 are symmetrically disposed. When clamping, the clamping element 11 contacts the side wall of the electronic device and the two stop elements contact the two corners of the electronic device so that the electronic device is clamped at three points. Because the stop elements 31 have an arc shape, the two stop elements can still maintain good contact with the sides of the two corners of the electronic device to maintain good clamping effect when the clamping distance increases during expansion outward. As such, the electronic device is still well clamped when the size changes due to a protective cover.

To avoid shielding the camera lens at the back of the electronic device when clamping, the base unit 1 is disposed with a hole 12 of a long stripe-shape, located close to the clamping element 11.

Figure 3:
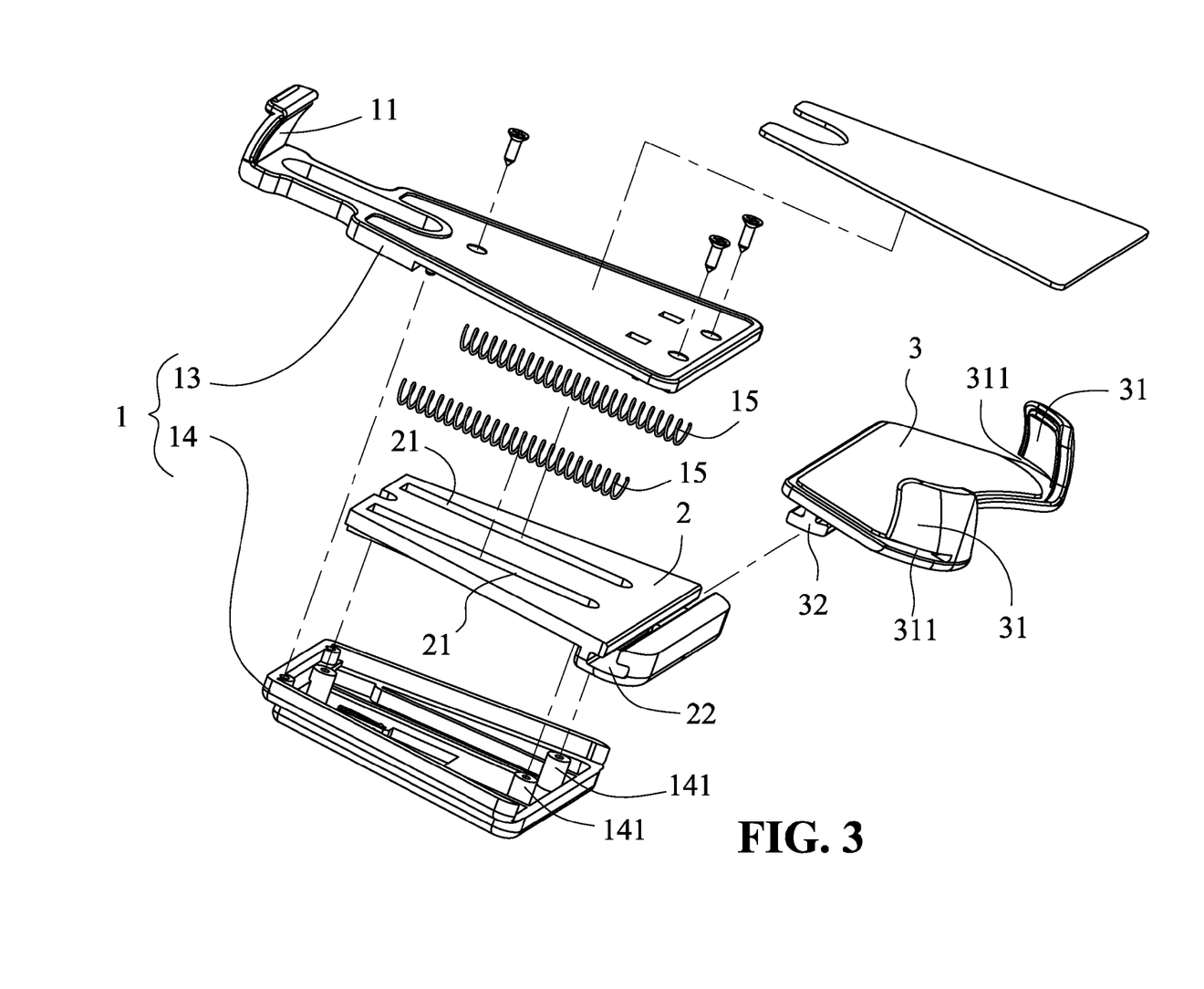
FIG. 3 shows a detailed dissected view of the present invention.

The movable unit 2 partially extends into the base unit 1. In addition to linear movement, the movable unit 2 can restore to original position when an applied external force disappears, which is similar in structure with a conventional design. However this embodiment is only for illustrative, instead of restrictive purpose. As shown in FIG. 3, the base unit 1 includes an upper lid 13 and a lower lid 14 to match and engage. The space between the matching lids allows the movable unit 2 to enter. The lower lid 14 further includes two guiding pillars 141. The guiding pillars 141 pass the guiding channel 21 of the movable unit 2 when assembled so that the movable unit 2 can partially move in a linear manner inside the base unit 1 without disengaged from the base unit 1. At least a resilient element 15 is disposed inside the base unit 1. In the present embodiment, the resilient element 15 is a spring. When assembled, the resilient element 15 is located in the guiding track 21 to provide the restoration force of the movable unit 2 when the applied external force disappears.

The carrier unit 3 is detachably disposed at the movable unit 2. When in use, the two move simultaneously. The structure includes the disposition of an engaging trench 22 at a partial segment of the movable unit 2. The segment will not enter the base unit 1 when the movable unit 2 moves. In the present embodiment, the engaging trench 22 has a cross section of upside down T shape. The carrier unit 3 further includes a sliding track 32. The carrier unit 3 slides the sliding track 32 into the engaging trench 22 so that the two can be fixed together. The direction of the engaging trench 22 is perpendicular to the linear movement direction of the movable unit 2 so that the position on the electronic device by the base unit can be adjusted when clamped.

Figure 4:
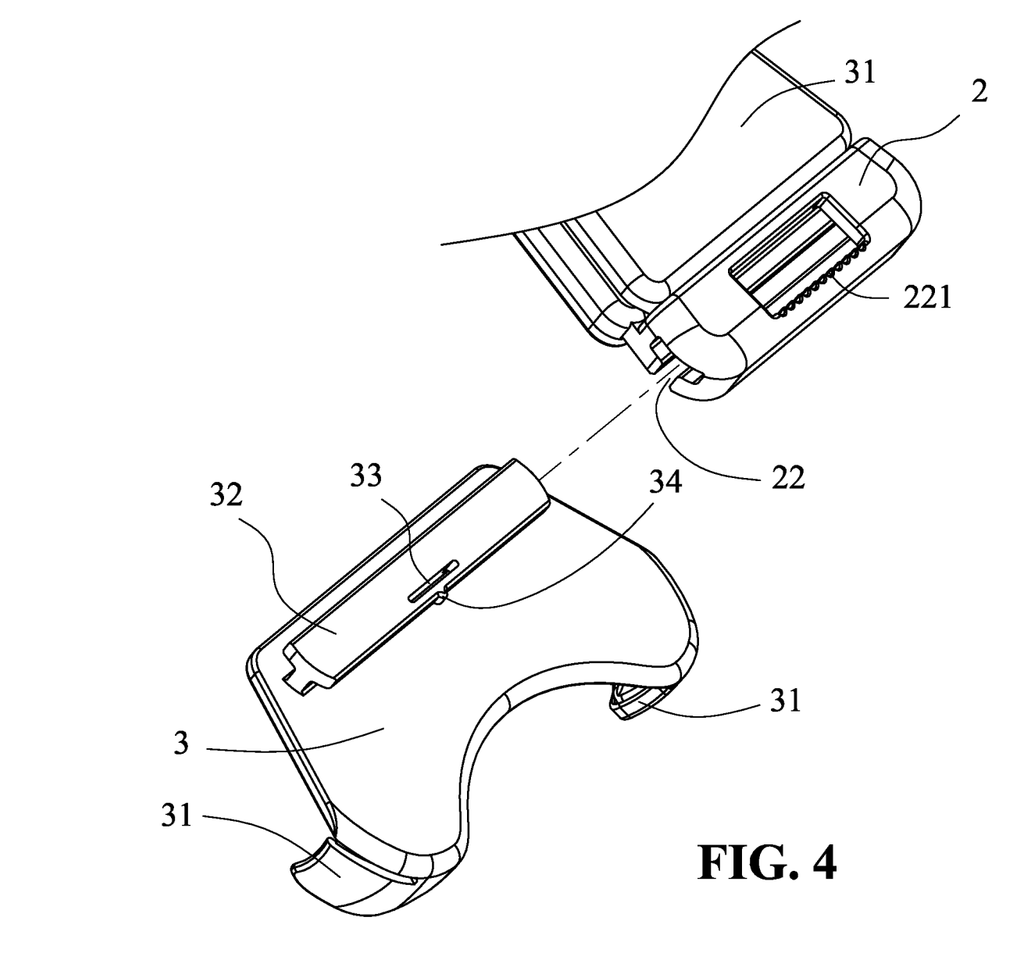
FIG. 4 shows a schematic view of the engagement between the movable unit and the carrier unit of the present invention.

To fix the positions of the movable unit 2 and carrier unit 3 after adjustment, the present invention further includes a special design. A shown in FIG. 4, a tooth surface 221 is disposed on a part of inner wall of the engaging trench 22. Correspondingly, the sliding track 32 includes a long strip hole 33 at corresponding location and a protruding tooth 34 is disposed on the side wall neighboring the long strip hole 33 so that the protruding tooth 34 has a contraction elasticity. When the sliding track 31 enters the engaging trench 22, the protruding tooth 34 will contract first and then engaged to a tooth trench of the tooth surface 221 to further fix the lateral position of the carrier unit 3 on the movable unit 2.

Figure 5:
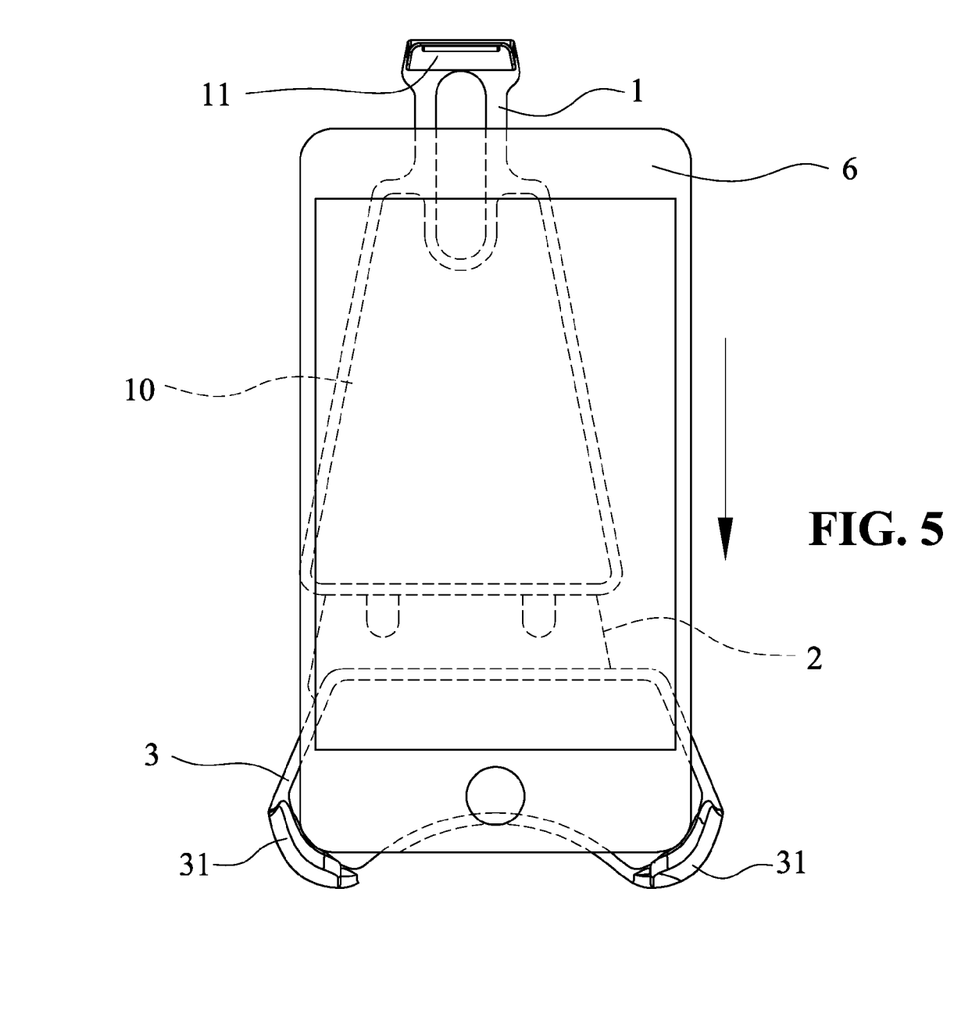
FIG. 5 shows a schematic view of en electronic device placed in the clamping apparatus of the present invention.
Figure 6:
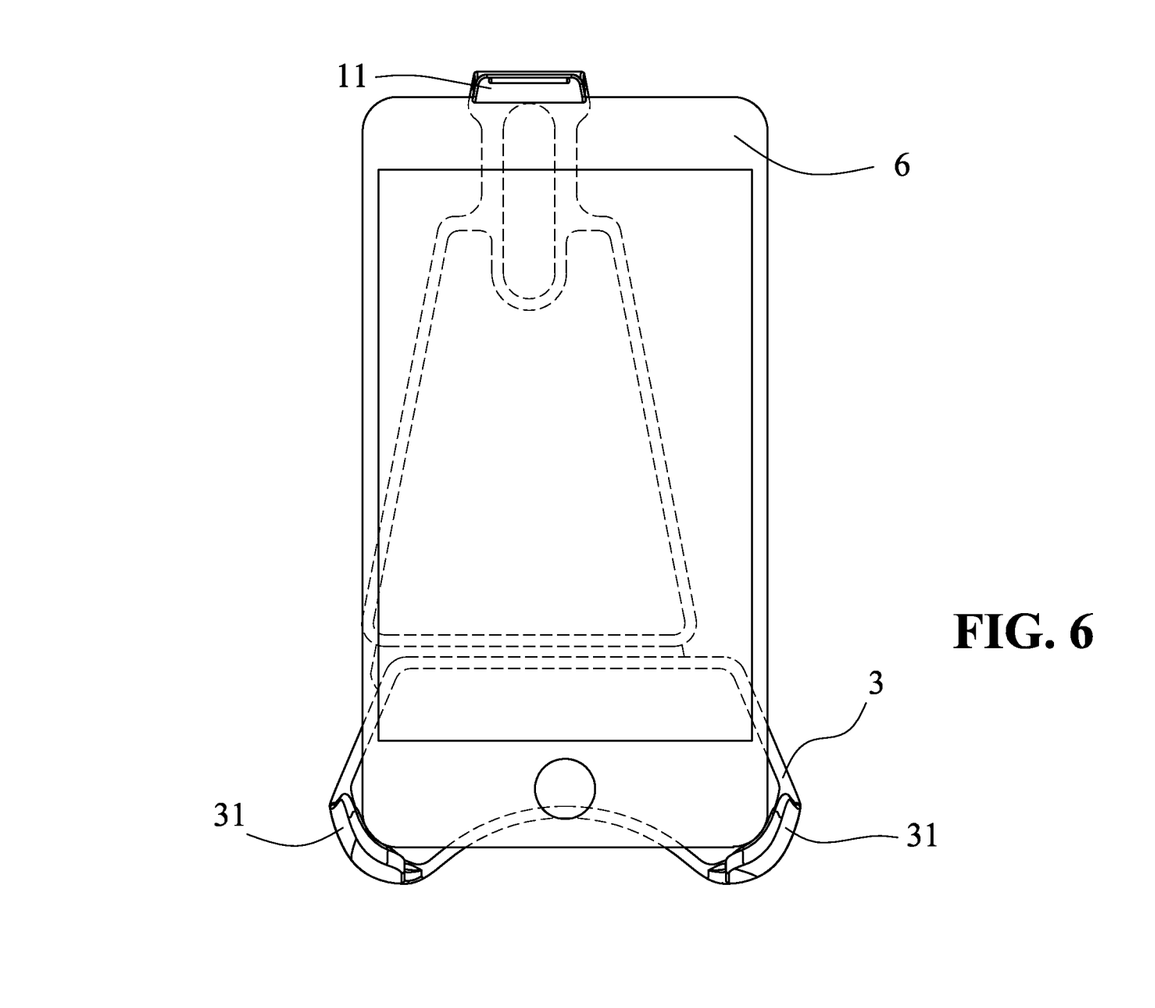
FIG. 6 shows a schematic view of shifting the clamping position on the electronic device according to the present invention.

As shown in FIG. 5, the base unit 1 includes at least a resilient unit 15 inside to contact the movable unit 2. The resilient element 15 provides a restoration force to the movable unit 2 after the movement. When in use, the two corners of the electronic product 6 are placed to contact the two stop elements 31 and a force is applied to move the movable unit 2 to enable placing the electronic device 6 on the placement surface 10 of the base unit 1. Then, the external force stops and the restoration force from the resilient element 15 enables the electronic device 6 to be clamped between the clamping element 11 and two stop elements 31, as shown in FIG. 6. Because the carrier unit 3 can adjust the position on the movable unit 2, as shown in FIG. 6, the clamping element 11 can shift to one side to avoid shielding the camera lens at the back of the electronic device 6 when clamping the electronic device 6.

Figure 7:
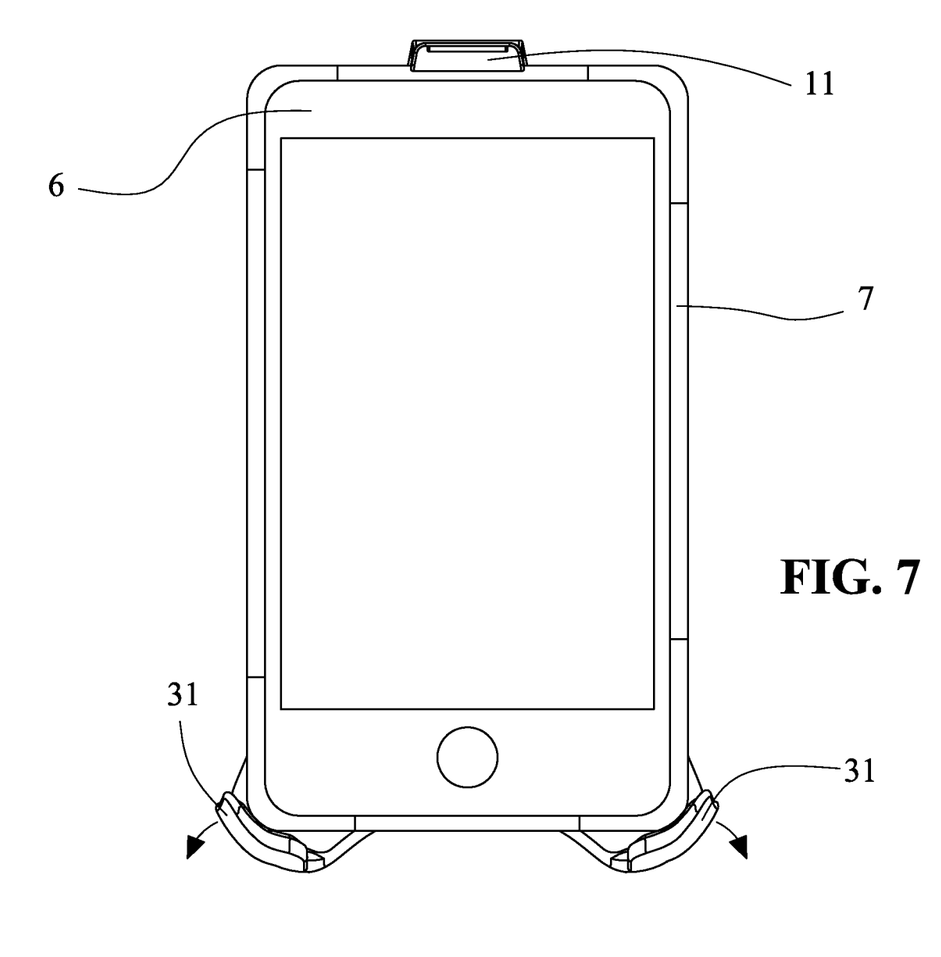
FIG. 7 shows a schematic view of the clamping apparatus of the present invention with two stop elements expanding to a large width.

FIG. 7 shows another application of the present invention. As shown in FIG. 7, the electronic device 6 is covered with a protective cover 7 on the circumference so that the overall size increases. At this point, the two stop elements are pushed to expand outward. The arc shape of the stop elements 31 allows the stop elements 31 to maintain good contact with the corners of the electronic device to achieve good clamping effect.

Figure 8:
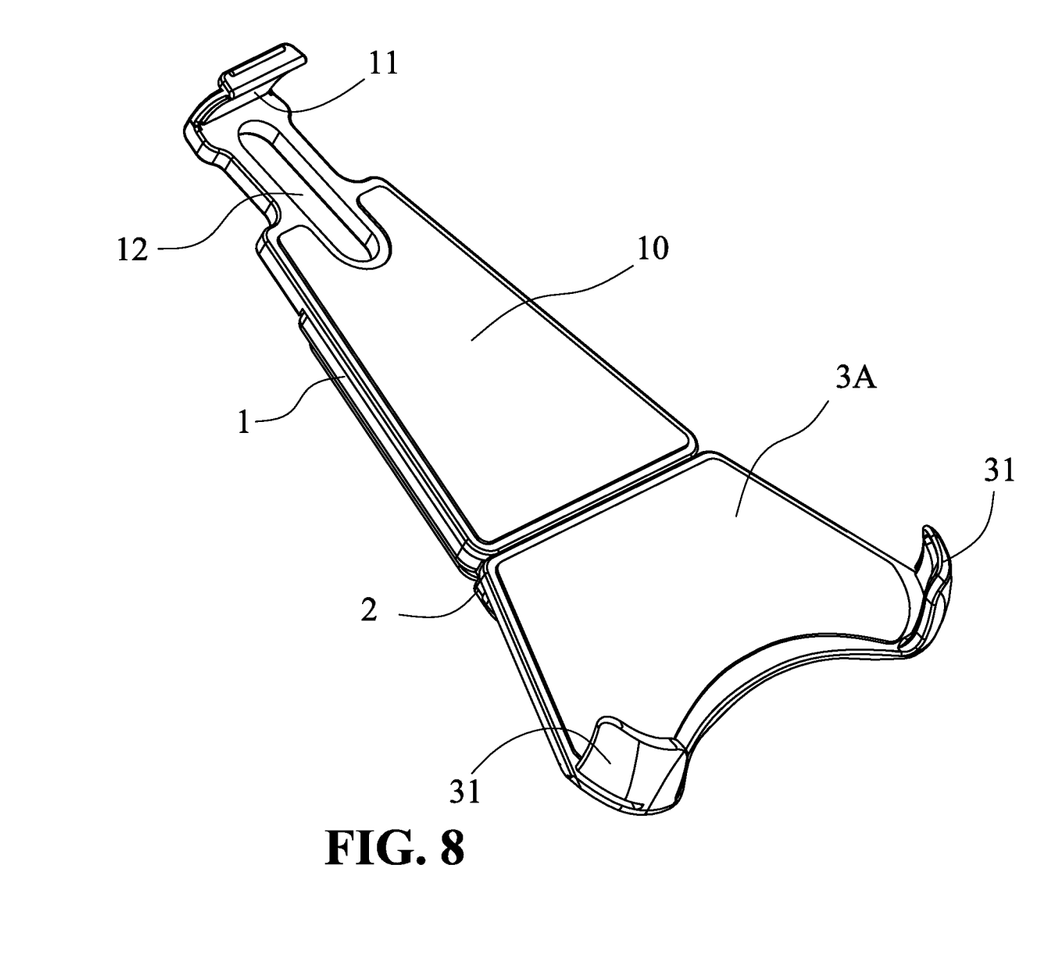
FIG. 8 shows a schematic view of another embodiment of the present invention.

FIG. 8 shows a schematic view of another embodiment of the present invention. The present embodiment differs from the previous embodiment is that the carrier unit 3A is of a larger size. Although the present invention is a dedicated clamping apparatus, mainly suitable for an electronic device of a specific size. However, by allowing using the carrier unit 3A of a different size, the present invention can be used to accommodate electronic devices of various sizes.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A clamping apparatus, comprising:
    a base unit, comprising a placement surface for placing an electronic device;
    a movable unit that partially extends into the base unit and being linearly movable;
    a carrier unit detachably disposed at the movable unit by disposing an engaging trench at a partial segment of the movable unit so that the segment will not enter the base unit when the movable unit moves, and a sliding track being disposed at the carrier unit so that the carrier unit slides into the engaging trench with the sliding track;
    a clamping element located on the base unit; and
    two stop elements located on the carrier unit, the stop elements having an arc shape and being partially engaged to the carrier unit with elasticity to be pushed to expand outward, a maximum clamping distance between the two stop elements being increased when applying an external force, the clamping element and the stop elements protruding respectively on two sides of the placement surface so that the electronic device can be clamped between the clamping element and the two stop elements.

2. The clamping apparatus as claimed in claim 1, wherein the direction of the engaging trench is perpendicular to the direction of linear movement of the movable unit.

3. The clamping apparatus as claimed in claim 1, wherein a tooth surface is disposed on a part of inner wall of the engaging trench, the sliding track is disposed with a long strip hole at corresponding location and a protruding tooth is disposed on the side wall neighboring the long strip hole so that the protruding tooth has a contraction elasticity; when the sliding track enters the engaging trench, the protruding tooth will contract first and then engaged to a tooth trench of the tooth surface to further fix the lateral position of the carrier unit on the movable unit.

4. The clamping apparatus as claimed in claim 1, wherein at least a resilient element is disposed inside the base unit to contact the movable unit to provide a restoration force after the movable unit moves.

5. The clamping apparatus as claimed in claim 1, wherein a gap exists at the junction between the stop elements and the carrier unit.

6. The clamping apparatus as claimed in claim 1, wherein a distance exists between the two stop elements and the two stop elements are disposed symmetrically.

* * * * *